United States Patent [19]

Curchod

[11] Patent Number: 4,776,215

[45] Date of Patent: Oct. 11, 1988

[54] DYNAMIC BALANCING SYSTEM AND METHOD

[75] Inventor: Donald B. Curchod, Woodside, Calif.

[73] Assignee: Dynabal Corporation, San Jose, Calif.

[21] Appl. No.: 44,596

[22] Filed: Apr. 30, 1987

[51] Int. Cl.⁴ ............................................. G01M 1/22
[52] U.S. Cl. ........................................ 73/462; 73/1 B
[58] Field of Search ................................. 73/462, 1 B

[56] References Cited

U.S. PATENT DOCUMENTS

| Re. 31,971 | 8/1985 | Gold | 73/462 |
|---|---|---|---|
| 4,338,818 | 7/1982 | Hill et al. | 73/462 |
| 4,348,885 | 12/1982 | Mueller | 73/1 B |
| 4,352,291 | 10/1982 | Churchod | 73/462 |
| 4,424,711 | 1/1984 | Giers et al. | 73/462 |
| 4,480,472 | 11/1984 | Wood | 73/462 |

Primary Examiner—Stewart J. Levy
Assistant Examiner—Robert P. Bell
Attorney, Agent, or Firm—Flehr, Hohbach, Test, Albritton & Herbert

[57] ABSTRACT

Disclosed is a system and method for accurately balancing a wheel/tire assembly. The assembly is mounted onto a shaft of a dynamic wheel balancer to rotate therewith. The shaft and wheel/tire assembly are spun while the balancer senses and stores a first set of information (readings) indicating imbalance. Next, the wheel/tire assembly is released and reoriented at a different angle, for example 180 degrees, on the shaft of the balancer, followed by respinning the wheel/tire assembly while the balancer takes a second set of readings indicating imbalance under these changed conditions. The values of both sets of readings are stored and then compared to note the difference therebetween. The difference represents a measure of the aggregate actual and "apparent" imbalance. For example, if the reorientation is 180 degrees, then the difference will be twice the actual imbalance. If the reorientation is less than 180 degrees, then the difference will be proportionately less than twice the actual imbalance. Apparent imbalance may be cauased by (i) an unbalanced shaft, (ii) axial vibrations of the shaft caused by face plate run-out, (iii) bearing and belt noise under load, (iv) motor noise under load, etc. Any such difference is stored and later subtracted from future balancing readings in order to more accurately determine the correct amount of counterbalancing weight to be added to a wheel/tire assembly, so that the wheel will remain balanced after removal from the shaft.

3 Claims, 2 Drawing Sheets

DYNAMIC BALANCING SYSTEM AND METHOD

This invention pertains to a dynamic balancing system and method primarily useful in balancing vehicle wheel/tire assemblies. Typical equipment of the kind described employs a mounting shaft driven by a motor and belt drive whereby a wheel supported against a face plate on an end of the shaft can be rotated with the shaft to determine the amount and location of counterbalancing weight to be added to the wheel/tire assembly to cause it to become balanced.

In a dynamic balancing system wherein a wheel/tire assembly is mounted upon an unbalanced shaft, it is evident that part of the amount and location of the imbalance indicated by the machine will be derived from the unbalanced shaft. Therefore, whenever a wheel is counterbalanced based on its rotation with an unbalanced shaft, the wheel will be in balance only as long as it remains on the shaft, but when the wheel/tire assembly is mounted on a vehicle, it will no longer be properly balanced. Therefore, it has been generally thought necessary to balance the shaft by spinning it unloaded and then applying the proper indicated weight at the indicated radial position on the shaft, and this has typically been the practice.

It has been observed that simply balancing the unloaded shaft is not a sufficient correction to achieve precision balancing. A primary reason for this lies in the fact that the imbalance of an unloaded shaft has been observed to be significantly different from the imbalance of a loaded shaft for the reasons explained below. Thus, it has been observed that in the usual circumstance a balancer calibrated in this manner (i.e. balancing an unloaded shaft) retains a residual imbalance even when it indicates zero weight to be added. This residual imbalance can run well in excess of one-half ounce.

According to the method of the present invention, the shaft is not balanced but the wheel/tire assembly is balanced in a manner taking into account the imbalance forces of an unbalanced shaft as well as other factors which have been found to cause "apparent" or "false" imbalance signals. Typically, these are caused by noise from various sources as described below.

It has been discovered that when the shaft is rotated with a wheel loaded on one end, significant noise is generated by the system. This noise is sensed by the force transducers of the system whereby a false or "apparent" imbalance signal is generated so as to give an inaccurate indication of the amount and location for a counterbalance weight to be applied to the wheel/tire assembly.

For example, by loading one end of the shaft with a wheel/tire assembly, the bearings generate more nise, the motor noises increase due to added strain applied to the motor, drive belt noises increase, the weight of the wheel/tire assembly causes the shaft to flex, further increasing bearing noise from increased run-out and attendant noise, and run-out in the face plate produces axial vibrations, all of which provide signals indicating an "apparent" imbalance, which, in fact, is not associated with the wheel/tire assembly per se. In short, balancing a wheel/tire assembly by adding weights as indicated by the balancer will cause the wheel/tire assembly to be balanced only with respect to the system supporting and driving the wheel. Once the wheel/tire assemby is separated from its balancing system, the wheel/tire assembly will be out of balance. The degree of such imbalance will be directly related to the totality of noise sensed erroneously as imbalance information. Since much of the foregoing noise develops as a result of loading the shaft, pre-balancing an unloaded shaft has been observed to be of minimal value in achieving an accurate balancing of the wheel/tire assembly.

OBJECTS OF THE INVENTION

In general, it is an object of the invention to provide a system and method for dynamic balancing of a bosy such as a wheel/tire assembly in a manner which compensates for an unbalanced mounting shaft as well as for "apparent" imbalance signals caused by noise developed in the system.

It is another object of the invention to provide a system and method for calibrating a balancer to achieve precision balancing, substantially free of residual imbalance, i.e., to less than 0.1 ounce.

It is yet another object of the present invention to provide a system and method for balancing a wheel/tire assembly taking into account the total error in the system, i.e., comprising the imbalance of a mounting shaft as well as false or "apparent" imbalance signals caused by various sources of noise in the system, as in the drive system and shaft assembly. It is yet a further object of the invention to provide a system and method for balancing a wheel/tire assembly in a manner which compensates for manufacturing errors associated with the shaft assembly of the balancer, thereby significantly reducing the number of such shaft assemblies which are required to be rejected.

It is an additional object of the invention to provide a system and method for determining the total error in a wheel balancing system while carrying a wheel/tire assembly thereon and then using this total error to correct the output of the balancer to obtain the true imbalance of a wheel/tire assembly.

It is a further object of the invention to provide a system and method for balancing a wheel/tire assembly accurately enen though the shaft may be imperfect or out of balance.

The foregoing and other objects of the invention will become more evident when considered in conjunction with the following detailed description of the invention and drawings.

SUMMARY OF THE INVENTION

In general, in the system and method as herein disclosed for accurately balancing a wheel/tire assembly, the assembly is mounted onto a shaft of a dynamic wheel balancer to rotate therewith. The shaft and wheel/tire assembly as spun while the balancer senses and stores a first set of information (readings) indicating imbalance. Next, the wheel/tire assembly is released and reoriented at a different angle, for example 180 degrees, on the shaft of the balancer, followed by respinning the wheel/tire assembly while the balancer takes a second set of readings indicating imbalance under these changed conditions. The values of both sets of readings are stored and then compared to note the difference therebetween. The difference represents a measure of the aggregate actual and "apparent" imbalance. For example, if the reorientation is 180 degrees, then the difference will be twice the imbalance. If the reorientation is less than 180 degrees, then the difference will be proportionately less than twice the imbalance. Apparent imbalance may be caused by (i) an unbalanced shaft, (ii) axial vibrations of the shaft caused by face plate run-out, (iii) bearing and belt noise under load, (iv) motor noise under load, etc. Any such difference is stored and later subtracted from future balancing readings in order to more accurately determine the correct amount of counterbalancing weight to be added to a wheel/tire assembly, so that the wheel will remain balanced after removal from the shaft.

Accordingly, the balancing of a wheel/tire assembly comprises the steps of rotating the assembly with and supported on a rotatable mounting shaft, sensing imbalance forces acting thereon, determining an amount of counterbalancing weight to be applied to the assembly, and subtractng the appropriate value of the stored difference noted above from the value of the determined amount of counterbalancing weight.

The foregoing procedure can be significantly enhanced by developing a calibration factor for multiplying the stored difference and other values to be displayed. Thus, to calibrate a balancer to cause the displayed values to be accurate and true, the value sensed must be corrected by a calibration factor before being displayed. This also is true for modifying the difference noted above indicative of the aggregate of apparent and actual imbalance associated with the drive assembly, etc. One suitable method of calibration is described further below.

DETAILED DESCRIPTION OF PREFERRED EMBODIMENT

A wheel balancing system 10 as described further below serves to carry out a method as outlined in FIG. 2.

Figure 1:
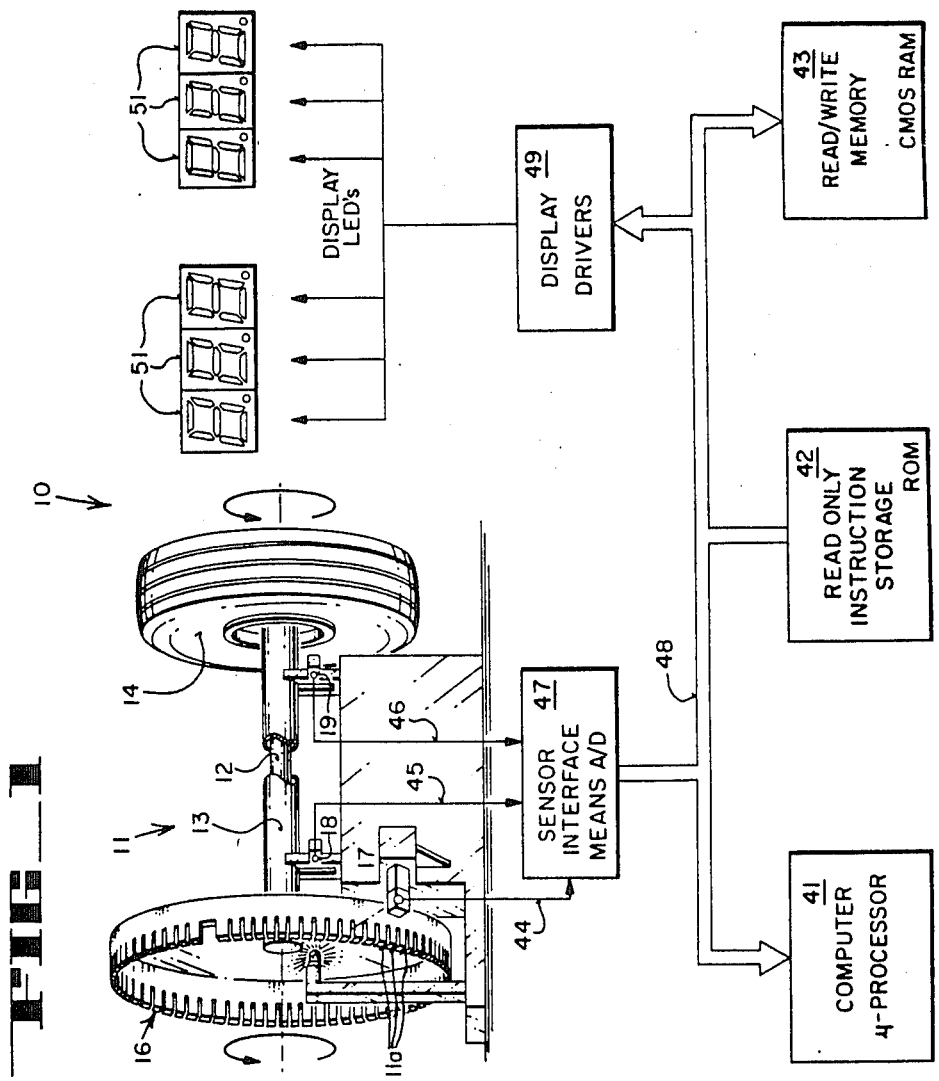
FIG. 1 shows a diagrammatic view of a computer arrangement for carrying out the method shown in FIG. 2.

As diagrammatically shown in FIG. 1, a dynamic wheel balancing machine 11 is generally characterized by a drive shaft 12 disposed within a hollow bearing housing 13 whereby means (not shown) such as a motor and belt drive serve to rotate drive shaft 12 in a known manner together with wheel and tire assembly 14 carried on the free end of shaft 12. The other end of shaft 12 carries a light chopper 16 arranged whereby a light source is disposed to project light in the path of a series of notches 11a to provide a succession of evenly spaced light pulses to a sensor 17.

By filling in one of the notches 11a, sensor 17 will receive no light pulse at one location during each revolution of the light chopper 16. In this way, as is known, a given reference position can be established whereby a counter counting pulses from sensor 17 can determine the rotational position of shaft 12 at any point in time.

In order to sense imbalance forces acting on wheel/tire assembly 14, force transducers 18, 19 are provided in a known manner as shown, for example, in U.S. Pat. No. 4,352,291.

Figure 2:
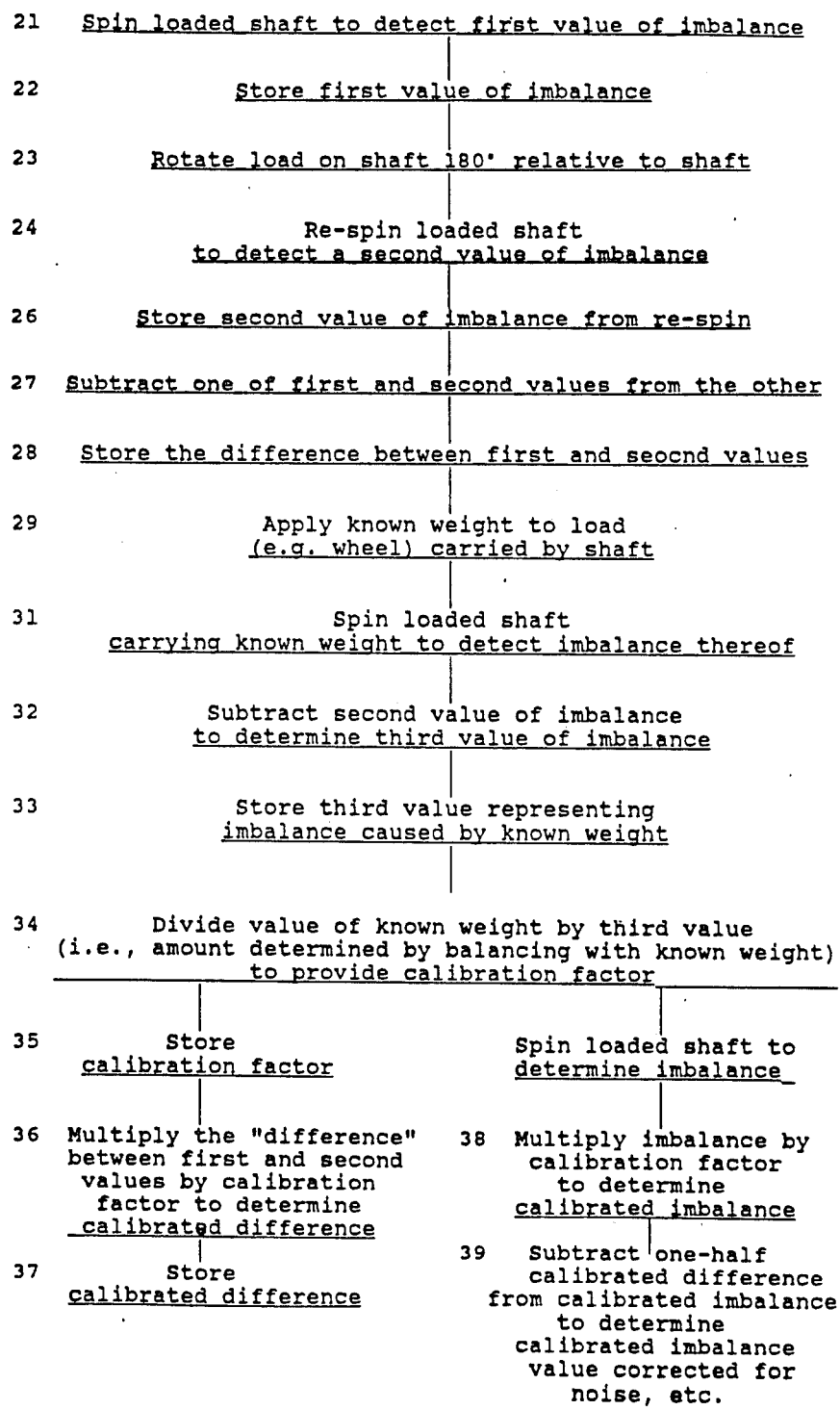
FIG. 2 shows a flow diagram according to a preferred method of calibrating a dynamic balancer and balancing a wheel thereon.

The general operation of the wheel balancing system 10 shown in FIG. 1 functions to carry out the method outlined in FIG. 2.

Accordingly, a wheel/tire assembly 14 loaded onto shaft 12 is first spun to provide imbalance forces from the wheel/tire assembly to transducers 18, 19 whereby information therefrom can be employed to detect imbalance in the wheel/tire assembly 14, all as referred to in step No. 21.

As noted in step 22, the first value of imbalance as detected by step 21, is then stored. Next, the wheel/tire assembly 14, or other load, is rotated on shaft 12 180 degrees relative to the shaft. Shaft 12 and wheel/tire assembly 14 are then re-spun to detect the imbalance in this reoriented position as indicated in step 24.

Next, the second value of imbalance from respinning of shaft 12 and wheel/tire assembly 14 is stored as noted in step 26, and subsequently one of the first and second values of imbalance is subtracted from the other to determine the difference therebetween as noted in step 27. The foregoing difference then is stored for subsequent use as indicated at step 28. It is to be observed that the difference between the first and second values of imbalance originates from such factors as imbalance the shaft, "apparent" imbalance derived from load noise in the system as well as from axial vibrations caused by run-out in the face plate against which the wheel/tire assembly 14 is mounted. Accordingly, the method as described to this point serves to determine this aggregate imbalance associated with the system from the sources noted above and others. However, certain of the foregoing values may not remain entirely true where the system is in need of calibration.

Therefore, in order to calibrate system 10, a known weight such as a 3.5 ounce weight is applied to the load such as the wheel/tire assembly 14, all as identified as step 29. Then a loaded shaft carrying the known weight is again spun as shown in step 31 to permit the system to detect the imbalance thereof. This third value of imbalance is caused by the presence of the known weight, the second value of imbalance as noted in step 26, and variations in the system. Accordingly, after spinning the loaded shaft carrying the known weight, the second value of imbalance is substracted to determine the third value of imbalance as noted in step 32. This third value of imbalance is then stored in step 33 and represents the imbalance provided by the known weight. This third value is then displayed by the wheel balancing machine whereby if the value does not equal the value of the known weight, it is evident that the machine is not in calibration and should be brought into calibration as now to be described.

Accordingly, as indicated in step 34, the value of the known weight, such as 3.5 ounces is divided by the third value determined in step 32 (i.e., the amount determined by balancing the wheel/tire assembly with a known weight). Thus, for the sake of example, if the value of the known weight is 3.5 ounces and the value of imbalance which is displayed by the machine shows 7 ounces, it is evident that any other values displayed by the machine will need to be divided by two to cause them to be accurate. Accordingly, a calibration factor can be provided by dividing the value of the known weight such as 3.5 ounces by the third value (i.e., the amount determined by balancing with the known weight), as noted in step 34. The calibration factor is then stored at step 35.

In order to properly state the difference between the first and second values noted in step 28, this difference is multiplied by the calibration factor so as to determine a "calibrated difference" as noted in step 36. Step 37 refers to storing the calibrated difference for further use.

With the system in the above calibrated condition, it is then possible to provide balancing of wheel/tire assemblies 14 in a manner properly compensating for "apparent" and actual error caused by the apparatus. Accordingly, as shown in the three-step branch of the method in the lower right-hand portion of FIG. 2, in order to properly balance a wheel/tire assebmly, a loaded shaft is spun while detecting imbalance in the wheel. Next, the value of imbalance detected is multiplied by the calibration factor previously determined in order to provide a calibrated imbalance, as shown in step 38. Finally, by subtracting the calibrated difference from the calibrated imbalance, a calibrated imbalance value corrected for noise, shaft imbalance, etc., can be provided as noted in step 39.

Wheel balancing system 10 includes computer means such as a Z80 microprocessor disposed to receive instructions from a read-only instruction storage or ROM 42 such as a programmable read only memory, PROM, a read-only memory, ROM, or an erasable programmable read-only memory device, EPROM, of conventional construction. Accordingly, preprogrammed instructions for computer 41 are stored in storage 42. A read/write memory such as a CMOS RAM or other random-acess memory 43 provides a read/write memory which serves as a temporary data storage or a storage for calibration data. Accordingly, computer 41 serves to direct temporary or calibration data into the read/write memory 43 and also serves to display the weight and polar location of imbalance forces detected from wheel/tire assembly 14 with its associated supporting shaft 12.

The output from each of the sensors 17-19 is directed via leads 44, 45, 46 to an analog-to-digital converter or other suitable sensor interface unit 47. Computer 41 receives the digital output of sensor interface 47, calculates the imbalance force on the inner rim and outer rim of wheel assembly 14 and via a connecting trunk 48 controls display drivers 49 for operating each of the seven-segment display elements 51.

Briefly, the calibration routine for a given wheel balancing machine 11 includes the following steps:

Mounting the wheel/tire assembly 14 onto shaft 12 with no weight added to assembly 14. Data is obtained from sensors 18, 19 and stored in memory 43 as data #1. Assembly 14 is rotated 180 degrees on shaft 12 without rotating the shaft, then by spinning shaft 12 data from sensors 18, 19 is stored in memory 43 as data #2. Subsequently a weight of known value such as a 3.5-ounce weight or the like is attached to assembly 14 to the outside of the rim at a given position. Data is then obtained from sensors 18, 19 and stored in memory 43 as data #3. Subsequently, the known weight is removed and relocated onto the inside of assembly 14 and thereafter assembly 14 is spun whereby data can be obtained from sensors 18, 19 and again stored in memory 43 as data #4. Computer 41 is then instructed to divide the sum of data #1 and data #2 by a factor of 2. The quotient is then to be used as a correction factor for modifying the imbalance of a wheel sensed. Subsequently, computer 41 is instructed to divide the value of the known weight by the sum of the difference of data #3 minus data #2. The foregoing fraction can be employed later as an outside scale factor identified as $C_{out}$. The foregoing scale factor refers to the outside rim. Subsequently, computer 41 is instructed by instructions from ROM 42 to compute a calibration factor corresponding to the value of the known weight divided by the difference between data #4 and data #2. This calibration factor is referred to as an inside scale factor and represented as $C_{in}$ pertaining to the inside of the wheel. The values calculated for data offset, $C_{out}$, $C_{in}$, represent calibration data and are stored in memory 43.

The detection of the location and amount of counterbalancing forces is calculated based on the known use of polar coordinates as in various conventional balancers.

From the foregoing it will be readily evident that there has been provided an improved method and system for calibrating and balancing a wheel/tire assembly or other unbalanced body while compensating for any unbalance values which may derive from an unbalanced shaft, noise in the bearings, motor noises, and belt drive noises, etc.

I claim:

1. In the method of calibrating a dynamic wheel balancing machine to cause the imbalance values displayed to be corrected for shaft imbalance, bearing noise under load, and face plate runout under load, motor noise under load, belt noise under load, whereby the values displayed correspond to the true imbalance of a wheel/tire assembly, the balancing machine having a shaft assembly for carrying a wheel/tire assembly on one end thereof to be balanced while thereon, comprising the steps of loading a wheel/tire assembly onto the shaft, spinning the shaft and assembly together to generate imbalance forces and detecting a first value of imbalance therefrom, rotating the wheel/tire assembly relative to the shaft, re-spinning the loaded shaft to detect a second value of imbalance, subtracting one of said first and second values from the other to detect the difference therebetween, the difference being representative of a measure of the imbalance caused by the presence of a load carried on the rotating shaft and any existing imbalance in said shaft assembly, applying a weight to said wheel/tire assembly, said weight being of known value and attached to said wheel/tire assembly at any position thereon, spinning the shaft and wheel/tire assembly carrying said known weight to detect the imbalance thereof, subtracting said second value of imbalance to determine a third value of imbalance representing imbalance caused by said known weight, dividing the value of said known weight by said third value to define a calibration factor, multiplying said difference between said first and second values of imbalance by said calibration factor to calibrate said difference, and subtracting the value of said calibrated difference from said calibrated imbalance to determine an imbalance value corrected for said shaft imbalance and said bearing noises under load.

2. In a method for dynamically balancing a wheel to compensate for shaft imbalance, bearing noise under load, face plate runout under load, motor noise under load, and belt noise under load using a dynamic wheel balancer of a type having a shaft assembly for carrying a wheel/tire assembly on one end thereof to be balanced while carried thereon, and provided with a calibrated difference value stored therein, the calibrated difference value being determined by the steps comprising loading a wheel/tire assembly onto the shaft of the wheel balancer, spinning the shaft and assembly together to generate imbalance forces and detecting a first value of imbalance thereon, rotating the wheel/tire assembly relative to the shaft, respinning the loaded shaft to detect a second value of imbalance, subtracting one of said first and second values from the other to detect the difference therebetween, said difference being representative of a measure of the imbalance caused by the presence of a load carried on the rotating shaft and any existing imbalance in said shaft assembly, applying a weight of known value at any position to said wheel/tire assembly, spinning the shaft and assembly carrying said known weight to detect the imbalance thereof, subtracting said second value of imbalance to determine a third value of imbalance representing imbalance caused by said known weight, dividing the value of said known weight by said third value to define a calibration factor, multiplying said difference between said first and second values of imbalance by said calibration factor to provide said calibrated difference.

3. In a method for dynamically balancing a wheel/tire assembly to compensate for shaft imbalance, face plate runout, bearing noise and other spurious noises caused by the presence of a substantial load at one end of the shaft according to claim 2, comprising the steps of loading a wheel/tire assembly onto the shaft of the balancer, spinning the shaft and wheel/tire assembly together to generate imbalance forces and detecting the value of the imbalance forces, multiplying the value of the imbalance forces by said calibration factor to determine a calibrated imbalance force, and subtracting said calibrated difference from said calibrated imbalance value to determine an imbalance value corrected for shaft imbalance, bearing noise, face plate runout, motor noise and belt noise under load.

* * * * *